United States Patent [19]

Pospich et al.

[11] Patent Number: 4,678,832

[45] Date of Patent: Jul. 7, 1987

[54] HOT-MELT ADHESIVES OF PARTIALLY SAPONIFIED VINYL ESTER COPOLYMERS

[75] Inventors: Günther Pospich; Richard Gutte, both of Frankfurt am Main, Fed. Rep. of Germany

[73] Assignee: Hoechst Aktiengesellschaft, Fed. Rep. of Germany

[21] Appl. No.: 667,069

[22] Filed: Nov. 1, 1984

Related U.S. Application Data

[63] Continuation of Ser. No. 479,890, Mar. 29, 1983, abandoned.

[30] Foreign Application Priority Data

Mar. 31, 1982 [DE] Fed. Rep. of Germany ....... 3211915

[51] Int. Cl.$^4$ .............................................. C08F 16/06
[52] U.S. Cl. ....................................... 525/60; 525/57; 525/62
[58] Field of Search .............................. 525/57, 60, 62

[56] References Cited

U.S. PATENT DOCUMENTS

| | | | |
|---|---|---|---|
| 2,668,809 | 2/1954 | Bryant et al. ......................... | 525/60 |
| 2,715,590 | 8/1955 | Brockmann et al. ................. | 525/57 |
| 3,121,701 | 2/1964 | Ingleby ................................. | 524/388 |
| 3,296,018 | 1/1967 | Sullivan et al. .................... | 427/207.1 |
| 3,523,933 | 8/1970 | Inskip ................................... | 525/60 |
| 3,524,905 | 8/1970 | Coates .................................. | 525/57 |
| 4,140,668 | 2/1979 | Sumi et al. ............................ | 525/62 |
| 4,388,442 | 6/1983 | Taniguchi et al. ................... | 525/57 |

FOREIGN PATENT DOCUMENTS

| 1074757 | 7/1967 | United Kingdom ................. | 525/60 |
|---|---|---|---|
| 2069509 | 8/1981 | United Kingdom ................. | 525/57 |

*Primary Examiner*—Paul R. Michl
*Assistant Examiner*—Alex H. Walker
*Attorney, Agent, or Firm*—Berman, Aisenberg & Platt

[57] ABSTRACT

A resin-like product having a degree of hydrolysis of 50 to 70 mole percent is obtained by selective alcoholysis of a vinyl ester copolymer, if desired in the form of a mixture with a vinyl ester homopolymer. The starting material employed is preferably a vinyl acetate/crotonic acid copolymer. The resin is suitable for use as a hot-melt adhesive which forms coherent films capable of being activated by water or water vapor.

23 Claims, No Drawings

HOT-MELT ADHESIVES OF PARTIALLY SAPONIFIED VINYL ESTER COPOLYMERS

This application is a continuation of Ser. No. 479,890, filed Mar. 29, 1983, now abandoned.

The invention relates to a process for the preparation of a hot-melt adhesive based on polyvinyl alcohol by alcoholyzing a vinyl ester polymer in the presence of a basic catalyst, and to the hot-melt adhesive obtained by this process.

It is known that polyvinyl alcohol (PVAL) cannot, as such, be melted without decomposition. It is necessary, therefore, to lower the softening range of PVAL for processing by thermoplastic techniques. This is usually effected by incorporating plasticizers. Thus, for example, the use of trimethylolpropane to plasticize partially hydrolyzed PVAL, having a degree of hydrolysis of 75 to 90 mole percent, is described (cf. U.S. Pat. No. 3,121,701). The composition obtained by this process is suitable for the production of a water-soluble film.

It is also known that commercially available PVAL having a content of acetate groups of 0 to 85 percent by weight is suitable as the basis for a hot-melt adhesive containing, in addition, polyvinyl acetate and plasticizers; it is stated to be possible to use, as a one-component adhesive, a polyvinyl alcohol, a 4 percent strength by weight aqueous solution of which has a viscosity of 1.3 to 7 cp at a temperature of 20° C. and which still contains 10 to 80 percent by weight of vinyl acetate groups (cf. U.S. Pat. No. 3,296,018).

The object of the invention is the preparation of an adhesive which is based on polyvinyl alcohol, which can be melted easily and is water-soluble and which forms films having satisfactory cohesion.

The invention relates, therefore, to a process for the preparation of a hot-melt adhesive based on polyvinyl alcohol by alcoholyzing a vinyl ester polymer in the presence of a basic catalyst, and comprises subjecting, to alcoholysis with a lower alcohol, a vinyl ester copolymer which has a molecular weight (weight average) within the range from 60,000 to 400,000—if desired in admixture with a vinyl ester homopolymer which has a molecular weight (weight average) within the range from 30,000 to 200,000—so that a polyvinyl alcohol results which has an average degree of hydrolysis of 50 to 70 mole percent.

The starting material used is a vinyl ester copolymer which has a molecular weight within the range from 60,000 to 400,000, preferably from 80,000 to 200,000 (weight average, determined by the light scattering method using mercury vapor light). A suitable starting material is a copolymer formed from vinyl acetate and a compound of the formula (1)

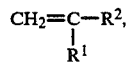

in which $R^1$ denotes a hydrogen atom or a methyl radical and $R^2$ represents (a) an alkylcarbonyloxy radical having 3 to 18, preferably 3 to 12, carbon atoms, (b) an alkoxy radical having 1 to 4 carbon atoms, (c) a nitrile group, (d) a hydrogen atom or a hydrocarbon radical having 1 to 8 carbon atoms or (f) a vinyl radical.

The following may be mentioned as examples of olefinically unsaturated compounds of the formula (1):
(a) vinyl esters of aliphatic carboxylic acids having 3 to 18, preferably 3 to 12, carbon atoms, for example vinyl propionate, vinyl butyrate, vinyl pivalate, vinyl isononate, vinyl laurate and vinyl decanates and also vinyl esters of a mixture of monocarboxylic acids having 9 to 11 carbon atoms,
(b) vinyl alkyl ethers, for example vinyl methyl ether, vinyl ethyl ether and vinyl n-butyl ether,
(c) acrylonitrile and methacrylonitrile,
(d) olefines, such as ethylene, styrene and α-methylstyrene, and
(e) butadiene and isoprene.

A copolymer formed from vinyl acetate and an olefinically unsaturated monocarboxylic or dicarboxylic acid having 2, 3 or 4 carbon atoms or an amide or an ester of such an acid, for example acrylic acid, methacrylic acid and, especially, crotonic acid and also maleic acid and fumaric acid and also acrylamide, methacrylamide, crotonamide and di-n-butyl maleate, is particularly suitable.

The comonomer is employed in an amount of 0.5 to 2, preferably 1 to 1.5, percent by weight (based on the copolymer and any homopolymer).

If desired, the vinyl ester copolymer is employed in admixture with a vinyl ester homopolymer which has a molecular weight (weight average, determined by the light scattering method using mercury vapor light) within the range from 30,000 to 200,000, preferably from 35,000 to 100,000. The homopolymer is preferably a polyvinyl acetate; the homopolymers of the vinyl esters mentioned above under (a) are, however, also suitable.

The alcoholysis of the vinyl ester polymer or, if desired, of the vinyl ester polymers is effected by means of a lower aliphatic alcohol which preferably contains 1, 2 or 3 carbon atoms. Methanol is particularly suitable. In this reaction the vinyl ester polymer or the vinyl ester polymers are saponified in solution. A polymer concentration of 30 to 80, preferably 60 to 75, percent by weight is advantageous. The alcoholysis, preferably methanolysis, is carried out in the presence of a basic catalyst. The catalyst employed is, in particular, an alkali metal alcoholate or an alkali metal hydroxide, for example sodium methylate, potassium methylate, sodium ethylate, potassium ethylate or sodium hydroxide and potassium hydroxide. The catalyst is used in an amount of 0.3 to 2 percent by weight, preferably 0.5 to 1.5 percent by weight (relative to the vinyl ester polymer). It is advisable to use the catalyst in a dissolved form, the solvent used being preferably the same alcohol as that employed as the solvent for the vinyl ester polymer or vinyl ester polymers. The alcohol is preferably used here as a mixture with water, the ratio by weight being 1:1 to 3:1. The alcoholysis is normally carried out at a temperature of 20° to 40° C., preferably 25° to 35° C. When the reaction is complete, the solvent is removed from the reaction mixture, preferably by evaporation at a temperature of 80° to 100° C. and, if appropriate, under reduced pressure.

The product obtained after the removal of the solvent is a water-soluble resin having an average degree of hydrolysis of 50 to 70, preferably 53 to 63, mole percent. The melting point of the resin is within the range from 120° to 160° C. The melt index of the resin is 2 to 40, preferably 4 to 30, g/10 minutes (determined at a temperature of 90° C. under a load of 2.16 kg). The viscosity of a 4 percent strength by weight aqueous solution of the resin is 1 to 4, preferably 1.5 to 2.5, mPa.s (determined at a temperature of 23° C.).

The resin obtained in accordance with the invention is suitable for use as a re-moistenable hot-melt adhesive, particularly for the production of adhesive layers on adhesive tapes, envelopes for letters, stamps and labels.

It is not necessary in such use to plasticizers or other agents affecting the meltability or viscosity. The resin forms, on the substrate, a non-blocking film which has good cohesion and good wettability and which can be activated by means of water or water vapor.

The examples which follow serve to illustrate the invention in greater detail. Unless otherwise specified, percentages and ratios relate to weight.

EXAMPLE 1

69 g of a copolymer formed from vinyl acetate and crotonic acid (95/5) and having a molecular weight of 100,000, and 280 g of a vinyl acetate homopolymer having a molecular weight of 35,000 were dissolved in 150 g of methanol by gentle stirring at a temperature of 25° C. in a stirred vessel. 17 g of a 15 percent strength solution of sodium hydroxide (water/methanol in a ratio of 1:2) were added in portions, while stirring, to the resulting solution, and the mixture was stirred further until it was completely homogeneous. The methanol and water were then removed by evaporation by heating the mixture to a temperature of 100° C.

The resulting water-soluble resin had a melting range from 130° to 150° C., a degree of hydrolysis of 55 mole percent and a melt index of 11 g/10 minutes. The viscosity of a 4 percent strength aqueous solution of the resin was 1.9 mPa.s.

EXAMPLE 2

Example 1 was repeated, using this time 80 g of the copolymer and 268 g of the homopolymer.

The resulting water-soluble resin had a melting range of 120° to 140° C., a degree of hydrolysis of 58 mole percent and a melt index of 18 g/10 minutes. The viscosity of a 4 percent strength aqueous solution of the resin was 1.95 mPa.s.

EXAMPLE 3

Example 1 was repeated using this time 76 g of the copolymer, 280 g of the homopolymer and 18 g of the sodium hydroxide solution.

The resulting water-soluble resin had a melting range from 130° to 145° C., a degree of hydrolysis of 60 mole percent and a melt index of 6 g/10 minutes. The viscosity of a 4 percent strength aqueous solution of the resin was 1.98 mPa.s.

EXAMPLE 4

Example 1 was repeated using this time 345 g of a copolymer formed from vinyl acetate and crotonic acid (98.6/1.4) and having a molecular weight of 60,000, and 18 g of the sodium hydroxide solution.

The resulting water-soluble resin had a melting range from 120° to 140° C., a degree of hydrolysis of 60 mole percent and a melt index of 4 g/10 minutes. The viscosity of a 4 percent strength aqueous solution of the resin was 2.1 mPa.s.

USE EXAMPLE 1

A sample of the resin obtained in accordance with Example 1 was melted at a temperature of 150° C. and applied to sulfate kraft paper by means of a doctor. The adhesive layer thus obtained had a thickness of 0.06 mm and, after cooling, formed a transparent, elastic, block-free film.

Test strips (2.5 cm×50 cm) were cut out of the coated paper and the adhesive layer was wetted with water. Immediately afterwards, cardboard strips (Neocart) of the same size were pressed onto the moistened adhesive layer of the test strips using a pressure of 2 bar. Immediately afterwards, the setting rate was determined using a Monarch Tack-Tester (manufacture: Thwing-Albert Instrument Company, Philadelphia, USA), i.e. the minium time for achieving a glued bond which could no longer be separated under the test conditions. The setting rate was 10 second (average value from 20 determinations).

USE EXAMPLE 2

Use Example 1 was repeated using the resin obtained in accordance with Example 2, which was melted at a temperature of 160° C. The setting rate was 15 seconds (average value from 20 determinations).

We claim:

1. A process for preparing hot-melt adhesive based on polyvinyl alcohol by alcoholyzing a vinyl ester polymer while stirring it in solution in the presence of a basic catalyst, which comprises:

subjecting a vinyl ester copolymer (dissolved in solvent) to alcoholysis with a lower alcohol until a completely homogeneous, admixture results with a polyvinyl alcohol which has an average degree of hydrolysis of from 50 to 70 mole precent, and thereafter removing the solvent therefrom;

the copolymer being that of vinyl acetate and a comonomer of the formula $$CH_2=C-R^2$$
$$\phantom{CH_2=}\vert$$
$$\phantom{CH_2=}R^1$$

in which $R^1$ denotes a hydrogen atom (—H) or a methyl radical and $R^2$ represents (a) an alkylcarbonyloxy radical having from 3 to 18 carbon atoms, (b) an alkoxy radical having from 1 to 4 carbon atoms, (c) a nitrile group, (d) a hydrogen atom (—H), (e) a hydrocarbon radical having from 1 to 8 carbon atoms or (f) a vinyl radical, and having a weight average molecular weight within the range of from 60,000 to 400,000;

said copolymer optionally being in admixture with a vinyl ester homopolymer which has a weight average molecular weight within the range of from 30,000 to 200,000; and the copolymer having therein an amount of comonomer which is from 0.5 to 2 percent by weight based on said copolymer and any homopolymer (prior to alcoholysis).

2. A process for preparing hot-melt adhesive based on polyvinyl alcohol by alcoholyzing a vinyl ester polymer while stirring it in solution in the presence of a basic catalyst, which comprises:

subjecting a vinyl ester copolymer (dissolved in solvent) to alcoholysis with a lower alcohol until a completely homogeneous admixture results with a polyvinyl alcohol which has an average degree of hydrolysis of from 50 to 70 mole percent and thereafter removing the solvent therefrom;

the copolymer being that of vinyl ester and (a) an olefinically unsaturated monocarboxylic or dicarboxylic acid having 2, 3 or 4 carbon atoms or (b) an amide or an ester of such acid, and having a weight average molecular weight within the range of from 60,000 to 400,000;

said copolymer optionally being in admixture with a vinyl ester homopolymer which has a weight average molecular weight within the range of from 30,000 to 200,000; and the copolymer having therein an amount of comonomer which is from 0.5 to 2 percent by weight based on said copolymer and any homopolymer.

3. A process as claimed in claim 2, wherein the vinyl ester copolymer is a copolymer of vinyl acetate and crotonic acid.

4. A hot-melt adhesive prepared in accordance with a process claimed in claim 1.

5. A hot-melt adhesive as claimed in claim 4, which can be melted within the range from 120° to 160° C.

6. A hot-melt adhesive as claimed in claim 4, which has a melt index of 2 to 40 g/10 minutes (determined at a temperature of 90° C. under a load of 2.16 kg).

7. A process as claimed in claim 1 wherein the copolymer is in admixture with a vinyl ester homopolymer.

8. A hot-melt adhesive prepared in accordance with a process as claimed in claim 7.

9. A hot-melt adhesive as claimed in claim 8, which can be melted within the range from 120° to 160° C.

10. A hot-melt adhesive as claimed in claim 8, which has a melt index of 2 to 40 g/10 minutes (determined at a temperature of 90° C. under a load of 2.16 kg).

11. A process as claimed in claim 1 wherein the copolymer is not in admixture with a vinyl ester homopolymer.

12. A hot-melt adhesive prepared in accordance with a process claim in claim 11.

13. A hot-melt adhesive as claimed in claim 12, which can be melted within the range from 120° to 160° C.

14. A hot-melt adhesive as claimed in claim 12, which has a melt index of 2 to 40 g/10 minutes (determined at a temperature of 90° C. under a load of 2.16 kg).

15. A process of obtaining a water-activatable non-blocking film with good cohesion and good wettability which comprises melting an adhesive as claimed in claim 4, applying a thin layer of resulting melted adhesive to a substrate and permitting the layer to cool to an elastic block-free film.

16. A water-soluble substantially solvent-free polyvinyl-alcohol-based water-activatable hot-melt adhesive which comprises a lower-alcohol basic-catalyst alcoholyzed vinyl ester copolymer composition which has an average degree of hydrolysis of from 50 to 70 mole percent;

the copolymer being that of vinyl acetate and a comonomer of the formula

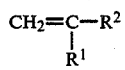

in which $R^1$ denotes a hydrogen atom (—H) or a methyl radical and $R^2$ represents (a) an alkylcarbonyloxy radical having from 3 to 18 carbon atoms, (b) an alkoxy radical having from 1 to 4 carbon atoms, (c) a nitrile group, (d) a hydrogen atom (—H), (e) a hydrocarbon radical having from 1 to 8 carbon atoms or (f) a vinyl radical, and having a weight average molecular weight within the range of from 60,000 to 400,000;

the composition optionally comprising, in admixture with said copolymer, a vinyl ester homopolymer which has a weight average molecular weight within the range of from 30,000 to 200,000;

the copolymer having therein an amount of comonomer which is from 0.5 to 2 percent by weight, based on said copolymer and any homopolymer.

17. A hot-melt adhesive as claimed in claim 16 wherein the copolymer composition comprises a vinyl ester homopolymer.

18. A hot-melt adhesive as claimed in claim 16 wherein the copolymer composition consists essentially of said vinyl ester copolymer.

19. A hot-melt adhesive as claimed in claim 16 which has a viscosity (as a 4 percent by weight aqueous solution) of from 1 to 4 mPa.s (determined at a temperature of 23° C.), which melts within a range of from 120° to 160° C. and which has a melt index of from 2 to 40 g/10 minutes (determined at a temperature of 90° C. under a load of 2.6 kg).

20. A polyvinyl-alcohol-based water-activatable hot-melt adhesive consisting essentially of a vinyl ester copolymer of claim 16 and melting within a range of from 120° to 160° C.

21. A process as claimed in claim 1, wherein the vinyl ester copolymer is a copolymer formed from vinyl acetate and a compound of formula (1)

in which $R^1$ denotes a hydrogen atom or a methyl radical and $R^2$ represents (a) an alkylcarbonyloxy radical having 3 to 18 carbon atoms, (b) an alkoxy radical having 1 to 4 carbon atoms, (c) a nitrile group, (d) a hydrogen atom or a hydrocarbon radical having 1 to 8 carbon atoms or (f) a vinyl radical.

22. A process for preparing hot-melt adhesive based on polyvinyl alcohol by alcoholyzing a vinyl ester polymer while stirring it in solution in the presence of a basic catalyst, which comprises:

subjecting a vinyl ester copolymer (dissolved in solvent) to alcoholysis with a lower alcohol until a completely homogeneous admixture results with a polyvinyl alcohol which has an average degree of hydrolysis of from 50 to 70 mole percent, and thereafter removing the solvent therefrom;

the copolymer being that of vinyl ester and (a) an olefinically unsaturated monocarboxylic or dicarboxylic acid having 2, 3 or 4 carbon atoms or (b) an amide or an ester of such acid, and having a weight average molecular weight within the range of from 60,000 to 400,000;

said copolymer optionally being in admixture with a vinyl ester homopolymer which has a weight average molecular weight within the range of from 30,000 to 200,000, 23. A process as claimed in claim 2 wherein the copolymer of vinyl ester is a copolymer of vinyl acetate.

* * * * *